United States Patent [19]

Tatsumi et al.

[11] Patent Number: 5,072,236

[45] Date of Patent: Dec. 10, 1991

[54] THICK FILM TYPE THERMAL HEAD

[75] Inventors: Yutaka Tatsumi; Teruhisa Sako; Kunio Motoyama; Syunji Nakata, all of Kyoto, Japan

[73] Assignee: Rohm Co., Ltd., Kyoto, Japan

[21] Appl. No.: 513,947

[22] Filed: Apr. 24, 1990

[30] Foreign Application Priority Data

May 2, 1989 [JP] Japan .................................. 1-113044
Jan. 29, 1990 [JP] Japan .................................. 2-019974

[51] Int. Cl.[5] ...................... B41J 2/335; G01D 15/10; G01D 15/16

[52] U.S. Cl. ................................ 346/76 PH; 219/543

[58] Field of Search .................... 346/76 PH; 219/543

[56] References Cited

U.S. PATENT DOCUMENTS

| | | | |
|---|---|---|---|
| 4,742,362 | 5/1988 | Takoshima et al. | 346/76 PH |
| 4,825,040 | 4/1989 | Kato | 346/76 PH |
| 4,835,550 | 5/1989 | Sato et al. | 346/76 PH |

FOREIGN PATENT DOCUMENTS

| | | | |
|---|---|---|---|
| 0120471 | 7/1984 | Japan | 346/76 PH |
| 0172551 | 9/1985 | Japan | 346/76 PH |
| 60-219073 | 11/1985 | Japan . | |
| 0119056 | 5/1987 | Japan | 346/76 PH |
| 0078760 | 4/1988 | Japan . | |

*Primary Examiner*—Benjamin R. Fuller
*Assistant Examiner*—Huan Tran
*Attorney, Agent, or Firm*—Wenderoth, Lind & Ponack

[57] ABSTRACT

A thick film type thermal head which includes an insulative substrate (2), an under-glaze layer (3) formed on the insulative substrate (2), a heat-generating resistor (6) and an electrode device for energizing the heat generating resistor (6) which are formed on the under-glaze layer (3), and an overcoating layer (7) for covering the heat-generating resistor (6). The overcoating layer (7) further includes a first overcoating layer (7*a*) formed by a thick film forming technique, and a second overcoating layer (7*b*) formed on the first overcoating layer (7*a*) through employment of a thin film forming technique.

7 Claims, 4 Drawing Sheets

THICK FILM TYPE THERMAL HEAD

BACKGROUND OF THE INVENTION

The present invention generally relates to a thermal head, and more particularly, to a thick film type thermal head having improved resistance against abrasion and wear.

Conventionally, there has been known a thick film type thermal head T as shown in FIG. 9, which includes an insulative substrate 12 made of alumina ceramics and the like, and an under-glaze layer 13 formed on said insulative substrate 12 as a heat accumulating layer by printing an amorphous glass paste onto said insulative substrate 12 for subsequent baking or sintering (referred to as baking hereinafter).

Moreover, on the under-glaze layer 13, an electrode 14 is formed by printing gold (Au) paste thereon for baking, with subsequent etching for pattern formation. In a manner to overlap said electrode 14, a resistor paste is printed for subsequent baking to form a heat-generating resistor 16.

Furthermore, over the insulative substrate 12, an overcoating layer 17 is formed so as to cover said heat-generating resistor 16 and the electrode 14 thereby. This overcoating layer 17 is also composed of an amorphous glass, and is formed by printing and baking a glass paste in the similar manner as in the under-glaze layer 13.

It is to be noted here that the above overcoating layer 17 has an effect to prolong the printing life of the thermal head by improving abrasion resistance of said thermal head with respect to a thermosensitive paper and a transfer ribbon.

In the conventional thermal head T as described so far, owing to the arrangement that the under-glaze layer 13 is formed prior to the overcoating layer 17, baking temperature at the baking process of said overcoating layer 17 is required to be set lower than a softening point of the under-glaze layer 13.

On the other hand, the relation between optimum baking temperature and the glass hardness after the baking is such that the hardness is reduced as the baking temperature is lowered, and from the viewpoint of maintaining a sufficient hardness of the overcoating layer, it is necessary to bake the glass paste for the overcoating layer at as high a temperature as possible within a range not exceeding the softening point of the amorphous glass for the under-glaze layer.

Meanwhile, in the relation between the baking temperature of the glass paste for the overcoating layer and pin hole density, the glass paste for the overcoating layer is required to be baked at high temperatures as far as possible within the rang not exceeding the softening point of the amorphous glass for the under-glaze layer 13 also for realizing reduction of pin holes.

However, at the present stage, there has not been proposed as yet, any superior glass paste for the overcoating layer which is capable of being baked at as high a temperature as practicable with respect to the softening point of the amorphous glass for the under-glaze layer 13 and simultaneously, can provide sufficient hardness and low pin hole density for the thermal head.

As one of the measures to solve the problems as described above, it is intended to raise the hardness by mixing a filler, for example, of fine particles of alumina (Al203), into the glass paste for the overcoating layer, but there is a possibility that mixing of a large amount of the filler deteriorates smoothness on the surface of the overcoating layer 17 for consequent reduction of the printing quality.

Table 1 given below shows characteristics of three kinds of glass pastes A,B and C for the overcoating layer currently in use. It is to be noted here that in the above case, the softening point of the amorphous glass for the under-glaze layer 13 is at 950° C., and the transition point thereof is at 690° C.

TABLE 1

| | | A | B | C | |
|---|---|---|---|---|---|
| Product name | | LS201 made by Tanaka Matsusei | LS223 made by Tanaka Matsusei | LS207 made by Tanaka Matsusei | |
| Component | PbO | 27.4 wt % | 19.7 wt % | 38.34 wt % | |
| | SiO2 | 18.6 | 13.9 | 5.4 | |
| | Al2O3 | 21.6 | 30.8 | 18.9 | Filler (Al2O3) |
| | ZrO2 | 1.5 | 1.1 | 0.01 | |
| | CdO | 31.0 | 34.5 | 37.4 | |
| Hardness Hk (kg/mm2) | | 604 | 710 | 550 | In the case of baking temp. at 810° C. |
| Surface roughness Ra (km) | | 0.14 Good | 0.28 Bad | 0.06 Superior | |
| Softening point | | 750° C. | 750° C. | 550° C. | |
| Hardness | | Medium | High | Low | |
| Pin hole | | Good | Bad | Superior | |

FIG. 4 shows the relation between the surface roughness of the glass pastes A,B and C, for the overcoating layers and the baking temperatures.

As is seen from Table 1 and FIG. 4, the surface roughness of the glass paste C with the filler at 18.9% is small as compared with that of the paste A or B. When the surface roughness of a first layer for the overcoating layer is small, the surface roughness of a second layer should naturally become small, with consequent improvement of the surface smoothness, whereby accumulation of paper dust or dirt due to contact of the thermal head with the paper during printing operation may be advantageously reduced for clear and definite printed characters so as to be suitable for a color printer or the like in which particular importance is attached to the image quality.

The glass paste C having a low softening point, with addition of only a small amount of the filler is superior in the aspect of the surface roughness, but low in the hardness. In the glass paste A having a high softening point and added with a small amount of the filler, each of the surface roughness, pin hole density and hardness is generally acceptable somehow. On the contrary, although the glass paste B having a high softening point and added with a large amount of the filler is superior in the aspect of hardness, it is inferior from the viewpoints of the surface roughness and pin hole density. Thus, even when any of the glass pastes A,B and C is employed, it is difficult to obtain the overcoating layer fully satisfactory.

Similarly, there has also been conventionally known a thick film type thermal head which is applied to printing of bar codes. Such a bar code printing thick film type thermal head is applied, for example, to an automatic ticket vending machine or the like for printing bar codes on railway tickets, etc. Since such automatic ticket vending machines, etc. are installed outdoors in many cases, sands and the like tend to be taken into the thick film type thermal head for the bar code printing etc., and moreover, due to the fact that paper for the railway tickets and the like to be handled by the vending machines is generally hard in quality, a so-called "scratch breakage" is readily produced on the thermal head through peeling off or separation of the overcoating layer.

As one means to overcome the disadvantages as described above, increase of hardness for the glass constituting the overcoating layer may be considered. However, glass with a high hardness tends to be rough on its surface. Moreover, increase of the hardness requires higher baking temperatures, but such baking temperatures for the overcoating layer are undesirably limited from the aspect that the overcoating layer is to be formed after formation of the under-glaze layer, electrode and heat-generating resistor. Accordingly, there is a limitation to the raising of the hardness of the overcoating layer, and thus, effective scratch breakage prevention measure can not be provided thereby.

Moreover, as another means for solving the above disadvantages, there may be employed a practice to increase the thickness of the overcoating layer, but this practice involves a new problem such as reduction in the printing efficiency, thus not providing any particularly effective prevention measure against the scratch breakage, either.

SUMMARY OF THE INVENTION

Accordingly, an essential object of the present invention is to provide a thick film type thermal head in which resistance against abrasion thereof has been improved without deteriorating its printing quality.

Another object of the present invention is to provide a thick film type thermal head of the above described type which is capable of preventing "scratch breakage" without lowering the printing efficiency.

In accomplishing these and other objects, according to one preferred embodiment of the present invention, there is provided a thick film type thermal head which includes an insulative substrate, an under-glaze layer formed on said insulative substrate, a heat-generating resistor and an electrode means for energizing said heat-generating resistor which are formed on said under-glaze layer, and an overcoating layer for covering said heat-generating resistor. The overcoating layer further includes a first overcoating layer formed by a thick film forming technique, and a second overcoating layer formed on said first overcoating layer through employment of a thin film forming technique.

In the thick film type thermal head according to the present invention having the construction as described above, since the hardness is maintained by the second overcoating layer, the glass itself constituting the first overcoating layer may be rather low in its hardness. Therefore, it becomes unnecessary to mix the filler in the glass paste for the overcoating layer thereby to prevent deterioration of the surface smoothness by the mixing of the filler. Moreover, owing to the fact that the surface of the first overcoating layer is made smooth as described above, the surface itself of the second overcoating layer to be formed thereon as a thin film also becomes smooth, and thus, there is no possibility that the printing quality is spoiled.

In another aspect of the present invention, in the thick film type thermal head which includes an insulative substrate, an under-glaze layer formed on said insulative substrate, a heat-generating resistor and an electrode means for energizing said heat-generating resistor which are formed on said under-glaze layer, and an overcoating layer for covering said heat-generating resistor, the overcoating layer further includes a first overcoating layer, and a second overcoating layer formed on said first overcoating layer for lamination, and said first overcoating layer is formed by printing and baking a glass paste containing a filler in a range between 30% and over and 60% and under in weight percentage, while said second overcoating layer is formed by a thin film forming technique through employment of a hard material.

In the thick film type thermal head of the present invention having the construction as described above, the first overcoating layer is preliminarily raised in its hardness to a certain extent by causing the glass paste to contain the filler in the above range, and the second overcoating layer having a still higher hardness is formed over said first overcoating layer in the form of thin film. Accordingly, hardness may be increased for the overcoating layers on the whole, thereby to prevent the undesirable scratch breakage. Since the second overcoating layer is very thin, the thickness of the entire overcoating layers is not substantially increased and thus, the printing efficiency is not particularly lowered.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
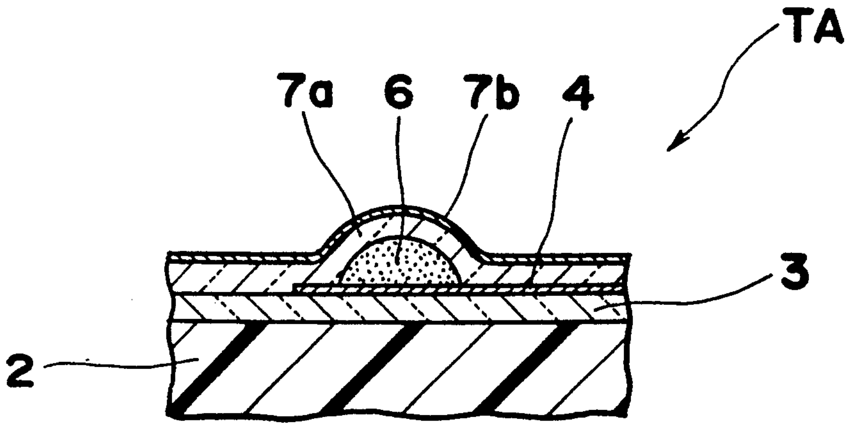
FIG. 1 is a fragmentary side sectional view showing construction of a thick film type thermal head according to one preferred embodiment of the present invention.

Before the description of the present invention proceeds, it is to be noted that like parts are designated by like reference numerals throughout the accompanying drawings.

Figure 9:
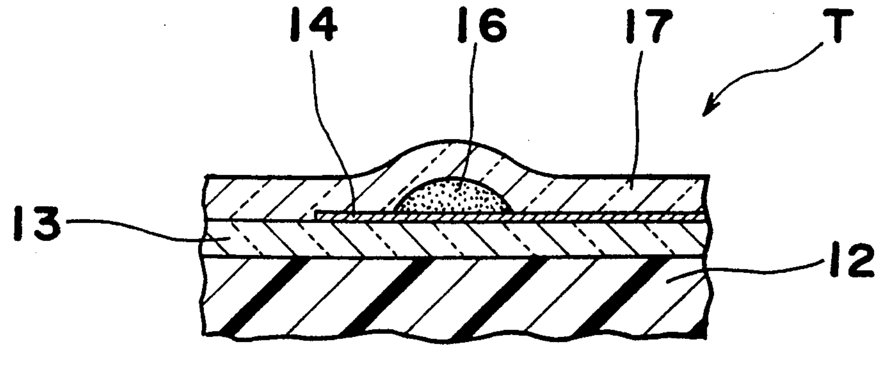
Fig. 9 PRIOR ART
FIG. 9 is a view similar to FIG. 1, which particularly shows construction of a conventional thermal head (already referred to).

Referring now to the drawings, there is shown in FIG. 1, a thick film type thermal head TA (referred to merely as a thermal head hereinafter) according to one preferred embodiment of the present invention, which includes an insulative substrate 2 made of alumina ceramics in the similar manner as in the conventional thermal head T referred to earlier with reference to FIG. 9, and an under-glaze layer 3 formed on said insulative substrate 2 by baking an amorphous glass paste applied by printing thereon so as to function as a heat accumulating layer.

Figure 2:
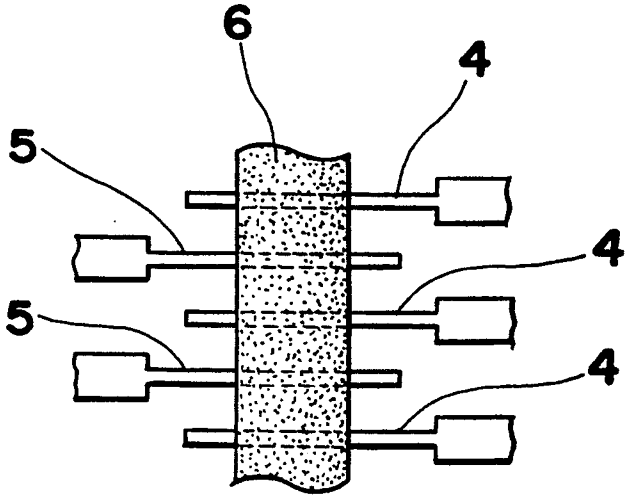
FIG. 2 is a diagram for explaining an electrode pattern of the thermal head of FIG. 1.

Onto the under-glaze layer 3, a gold paste is applied by printing for subsequent baking, which is then, subjected to etching for pattern formation to form separate electrodes 4 and common electrodes 5, which are arranged to be located alternately adjacent to each other (FIG. 2).

Moreover, onto the under-glaze layer 3, a resistor paste (e.g. a paste of ruthenium oxide group) is applied by printing in a belt-like configuration so as to be overlapped said separate electrodes 4 and common electrodes 5 for subsequent baking to provide a heat-generating resistor 6 (FIG. 2). The portion of the heat-generating resistor 6 held between the common electrodes 5 corresponds to one dot d (FIG. 3).

The heat generating resistor 6, separate electrodes 4 and common electrodes 5 referred to above are further coated by an overcoating layer 7, which includes a first overcoating layer 7*a* and a second overcoating layer 7*b* applied thereover. The first overcoating layer 7*a* is formed by baking an amorphous paste applied onto the under-glaze layer 3 through printing. For the formation of the first overcoating layer 7*a*, a glass paste prepared through addition of $\alpha$-$Al_2O_3$ and $ZrO_2$ as a filler in the range between 30% and over, and 60% and under by weight percentage, to glass of PbO-$SiO_2$ group or PbO-$SiO_2$-$ZrO_2$ group, with its hardness being set to be over 680 kg/mm2 in Knoop hardness number Hk (referred to as the glass paste A hereinafter).

Meanwhile, the second overcoating layer 7*b* is formed by sputtering a hard material such as sialon or the like, and the hardness Hk thereof is about 1700 kg/mm2 in the case where sialon is employed. It is to be noted here that the second overcoating layer 7*b* may be formed by using other thin film techniques such as vacuum deposition, etc.

Figure 3:
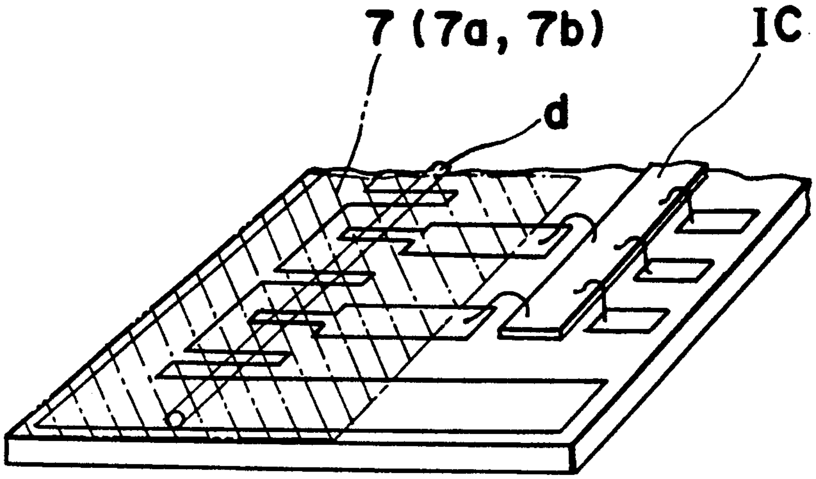
FIG. 3 is a fragmentary perspective view showing a region of the thermal head of FIG. 1 formed with a thick film overcoating glass layer.
Figure 4:
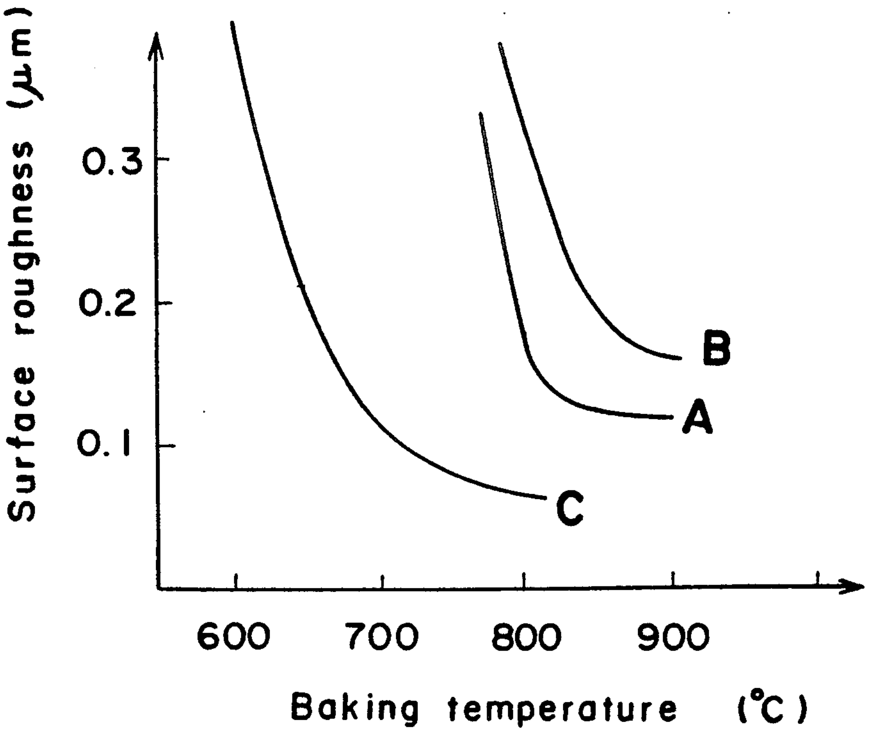
FIG. 4 is a graphical diagram showing the relation between surface roughness and baking temperature for the glass paste.

The fragmentary perspective view of the thermal head TA in FIG. 3 shows one example where an entire region applied with the thick film overcoating glass is formed into the double-layer construction as indicated by one-dotted chain line hatching.

The glass paste for the first overcoating layer 7*a* is subjected to baking at a temperature sufficiently lower than a transition point of the under-glaze layer 3. In this case, although its hardness is, of course, lowered, this presents no particular problem, since the layer which directly contacts the heat-sensitive paper, transfer ribbon, etc., is the second overcoating layer 7*b*. Owing to the fact that the second overcoating layer 7*b* is to be formed on the surface of the smooth first overcoating layer 7*a*, said layer 7*b* is also smooth, with a small influence on the printing quality, while the material of high hardness employed therefor improves the abrasion resistance thereof as compared with that in the conventional arrangements. It is to be noted here that the reason why the second overcoating layer 7*b* is not directly formed on the heat generating resistor 6 is to avoid deterioration in the printing quality due to formation of undulation on the surface of the heat-generating resistor 6 as it is, upon direct formation of said layer 7*b* on said resistor 6.

Since the thermal head TA according to the above embodiment is constituted by the first overcoating layer to be formed through employment of the thick film forming technique, and the second overcoating layer formed on said first overcoating layer by the use of the thin film forming technique, the resistance against abrasion and wear of the thermal head is remarkably improved, without deterioration of the printing quality.

Table 2 below shows the hardness Hk, surface roughness Ra, and results of scratch acceleration test for the overcoating layer (referred to as O.C. layer in Table 2) for the thermal head TA according to the embodiment as described so far, in comparison with those of comparative examples 1 and 2, it is to be noted here that both in the embodiment of the present invention and the comparative examples, the total thickness of the overcoating layer is set to be 10 $\mu$m.

TABLE 2

| | 1st embodiment of present invention Glass paste B Sialon | Comparative example 1 Glass paste A (A of Table 1) Sialon | Comparative example 2 Glass paste B (B of Table 1) Single material |
|---|---|---|---|
| Hardness Hk only of the first O.C. layer (kg/mm2) | 710 | 604 | 710 |
| Hardness Hk of entire first and second O.C. layers (kg/mm2) | 1464 | 886 | — |
| Surface roughness of entire first and second O.C. layers ($\mu$m) | 0.24 | 0.14 | 0.31 |
| scratch acceleration test (m) | 100 | 4 | 7 |

In Table 2, the comparative example 1 relates to a thermal head having the overcoating layer of two-layer construction as in the embodiment, with the second overcoating layer being formed by sputtering sialon, and the first overcoating layer is composed of the conventional glass paste (referred to as the glass paste A hereinafter). This glass paste A is prepared through addition of $\alpha$-$Al_2O_3$ and $ZrO_2$ as a filler in the range between 20 to 25% by weight percentage, to glass of PbO-$SiO_2$ group or PbO-$SiO_2$-$ZrO_2$ or PbO-$SiO_2$-$B_2O_3$-$ZrO_2$ group, with its hardness Hk after baking being set to be approximately in the range of 500 to 650.

Meanwhile, different from the thermal head in the embodiment, the thermal head in the comparative example 2 has the overcoating layer of a single layer construction, and this overcoating layer is composed of the glass past B referred to earlier.

Upon comparison with the comparative examples 1 and 2, the hardness Hk of the overcoating layers on the whole for the embodiment is extremely high at 1464. In the comparative example 1, in spite of the fact that the second overcoating layer is composed of sialon, the hardness Hk for the overcoating layers on the whole is 886. This shows that in order to raise the hardness of the overcoating layers in the whole, the hardness of the first overcoating layer should be preliminarily raised as far as permissible.

In the embodiment of Table 2, as a result of increased hardness for the entire overcoating layers, in the scratch acceleration test employing emery, the scanning length (in meter) up to formation of scratches becomes very long at 100 m as compared with the comparative examples 1 and 2.

Figure 5:
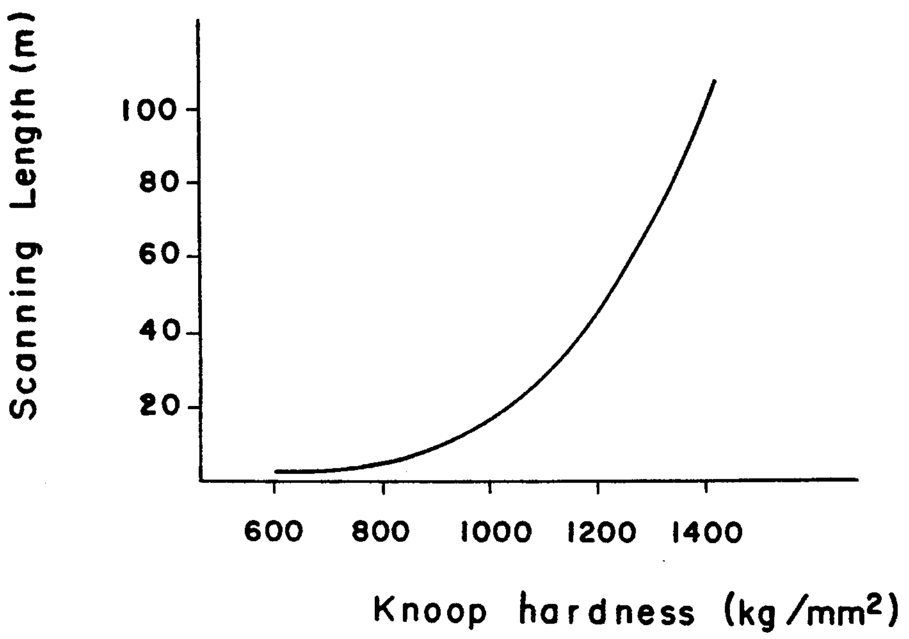
FIG. 5 is a graphical diagram showing the relation between scanning length and hardness of the overcoating layer in a scratch acceleration test.

From a graphic diagram of FIG. 5 showing the relation between the hardness Hk of the overcoating layers on the whole and the scanning length in the scratch acceleration test, it is seen that the scanning length is prolonged in an accelerated manner when the hardness Hk is increased.

However, due to employment of the glass paste B, the surface roughness for the embodiment is somewhat inferior to that of the comparative example 1, because the filler content of the glass paste B constituting the first overcoating layer is set to be larger than that of the glass paste A. Nevertheless, as compared with the comparative example 2, the surface roughness of the embodiment has been improved (i.e. the surface of the first overcoating layer has been made smooth by the second overcoating layer), thus presenting no particular problem in the actual applications.

Figure 6:
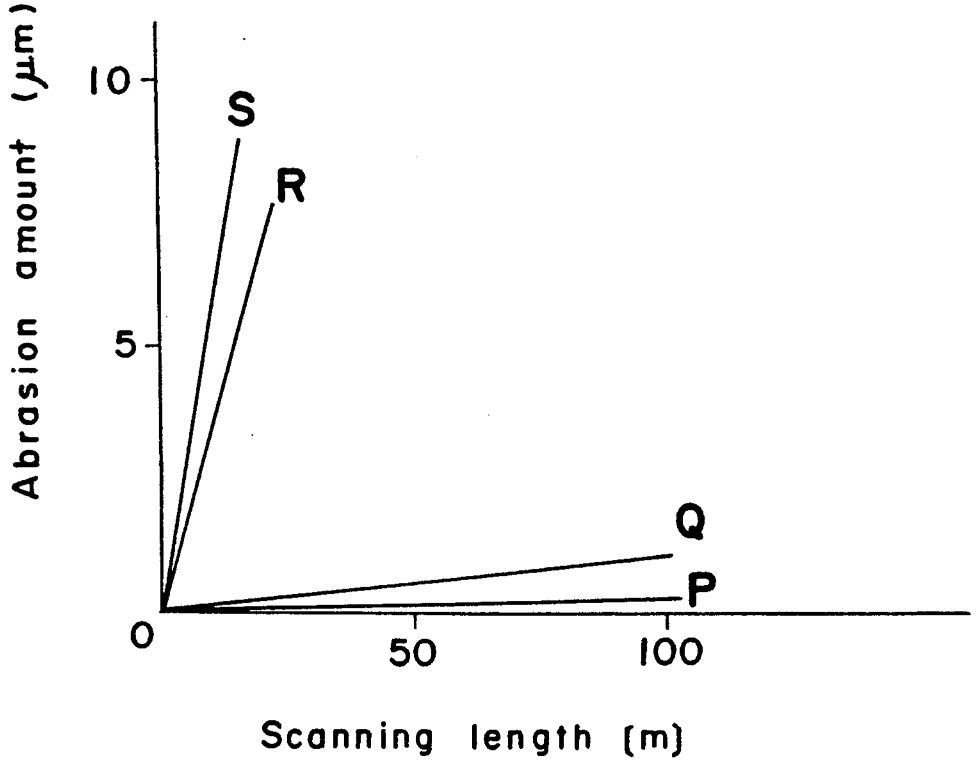
FIG. 6 is also a graphical diagram showing the relation between the scanning length and amount of abrasion in an accelerated abrasion test.

FIG. 6 shows the relation between the abrasion amount and the scanning length in an accelerated abrasion test employing abrasive material of #46.

In FIG. 6, a line P shows the test result using the glass paste B and sialon, a line Q represents the test result employing the glass paste A and sialon, a line R denotes the test result through employment of the glass paste B and $Ta_2O_5$, and a line S represents the test result using only the glass paste A.

In FIG. 6, there is a difference between the thermal head having the second overcoating layer of sialon (P,Q) and that having the second overcoating layer of $Ta_2O_5$ or having no second overcoating layer (R.S.), from which it is seen that sialon has superior resistance against abrasion and wear.

It should be noted here that the concept of the present invention is not limited in its application to the foregoing embodiment alone, but may also be applied, for example, to an end face type thermal head as well.

Figure 7:
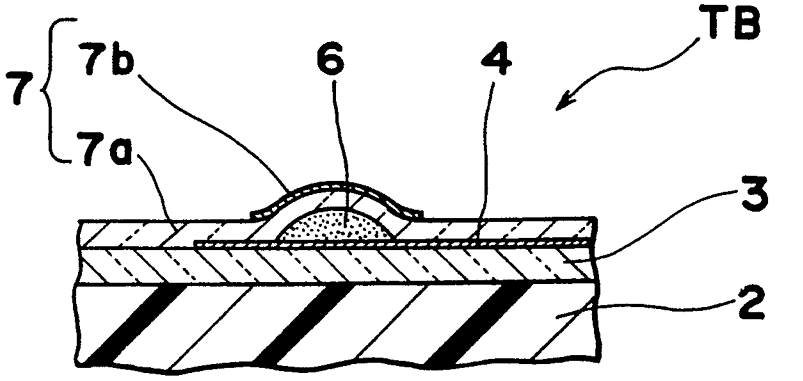
FIG. 7 is a view similar to FIG. 1, which particularly shows a modification thereof.
Figure 8:
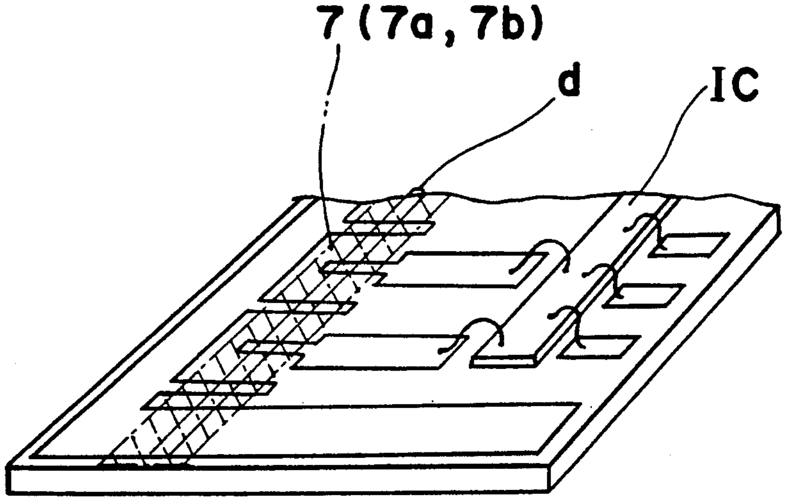
FIG. 8 is a fragmentary perspective view showing a region of the thermal head of FIG. 7 formed with a thick film overcoating glass layer.

Referring further to FIGS. 7 and 8, there is shown a thermal head TB according to a modification of the present invention, in which the region in which the overcoating glass layer is formed is limited to one portion.

More specifically, in a printing mechanism of an ordinary thermal head provided with a platen roller having a platen shaft applied with a plate rubber layer on the peripheral surface thereof (not particularly shown) for engagement with the thermal head, as the portion where the surface hardness and smoothness are required, a so-called nip width is set at the region where the platen rubber is crashed to be rubbed against the thermal head when pressure is applied to the thermal head. Such a nip width is to be determined by the rubber hardness, rubber layer thickness, diameter of the platen shaft and platen pressure, and according to a result of experiment, the nip width is in the range of 1.7 to 2.0 mm under the conditions in which the platen rubber diameter is 18 mmφ (platen shaft diameter is 12 mmφ), platen pressure is 4 kg, and hardness is 30° to 40° (shore hardness).

More specifically, the width of the two-layer construction portion formed with the thick film overcoating glass layer is set to be equivalent to the nip width at the minimum to cover the dots d as shown by a one-dotted chain line hatching in FIG. 8, and there is no particular problem even if the nip width is enlarged for the manufacture of the thermal head.

As is clear from the foregoing description, in the thick film type thermal head according to the one aspect of the present invention, since the overcoating layer is constituted by the first overcoating layer formed by thick film forming technique, and the second overcoating layer formed on the first overcoating layer through employment of the thin film forming technique, the resistance against abrasion and wear has been advantageously improved without deteriorating the printing quality.

Furthermore, in another aspect of the present invention, the overcoating layer is constituted by the first overcoating layer, and the second overcoating layer formed on said first overcoating layer for lamination, and the first overcoating layer is formed by printing and baking a glass paste containing a filler in a range between 30% and over and 60% and under in weight percentage, while the second overcoating layer is formed by the thin film forming technique through employment of the hard material. Therefore, there is another advantage that the sufficient resistance against the scratch breakage may be achieved without spoiling the printing quality.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A thick film type thermal head for printing bar codes which consists essentially of an insulative substrate, an under-glaze layer formed on said insulative substrate, a heat-generating resistor and an electrode means for energizing said heat generating resistor which are formed on said under-glaze layer, and an overcoating layer for covering said heat-generating resistor, said overcoating layer further comprising a first overcoating layer formed by a thick film forming technique, and a second overcoating layer formed on said first overcoating layer by employment of a thin film forming technique, said second overcoating layer being harder than said first overcoating layer.

2. The thick film type thermal head as claimed in claim 1, wherein said first overcoating layer (*7a*) is mainly composed of a glass material having a melting point lower than a transition point of a glass material employed for the under-glaze layer (3).

3. The thick film type thermal head as claimed in claim 1, wherein said first overcoating layer (*71*) is composed of a glass paste containing a filler in a range between 15% and over and 20% and under by weight percentage.

4. The thick film thermal head as claimed in claim 1, wherein said second overcoating layer (7*b*) is formed only at a region provided on said first overcoating layer (7*a*) covering said heat-generating resistor (6), and contacting a platen during its printing function.

5. The thick film type thermal head according to claim 1 wherein said second overcoating layer is formed by sputtering or chemical vapor deposition.

6. A thick film type thermal head for printing bar codes which consists essentially of an insulative substrate, an under-glaze layer formed on said insulative substrate, a heat-generating resistor and an electrode means for energizing said heat-generating resistor which are formed on said under-glaze layer, and an overcoating layer for covering said heat-generating resistor, said overcoating layer further comprising a first overcoating layer, and a second overcoating layer formed on said first overcoating layer for lamination, said first overcoating layer being formed by printing and baking a glass paste containing a filler in a range between 30% and 60% in weight percentage, said second overcoating layer being formed by a thin film forming technique by employing a hard material.

7. The thick film type thermal head according to claim 6 wherein said second overcoating layer is formed by sputtering or chemical vapor deposition.

* * * * *